United States Patent [19]

Shimazaki

[11] Patent Number: 5,068,997
[45] Date of Patent: Dec. 3, 1991

[54] ARTIFICIAL BAIT AND MATERIAL THEREFOR

[76] Inventor: Kenshiro Shimazaki, 4-334-1, Honcho, Kiryu-shi, Gunma-ken, Japan

[21] Appl. No.: 601,355

[22] Filed: Oct. 23, 1990

[30] Foreign Application Priority Data

Jul. 4, 1990 [JP] Japan .................................. 2-175419

[51] Int. Cl.$^5$ ............................................. A01K 85/00
[52] U.S. Cl. .................................. 43/42.25; 43/42.24
[58] Field of Search ................. 43/42.25, 42.24, 42.53, 43/42.32

[56] References Cited

U.S. PATENT DOCUMENTS

| | | | |
|---|---|---|---|
| 2,350,572 | 6/1944 | Schweigert | 43/42.25 |
| 2,575,248 | 11/1951 | Clark | 43/42.25 |
| 2,757,476 | 8/1956 | Pender | 43/42.25 |
| 2,775,055 | 12/1956 | Waugh et al. | 43/42.25 |
| 4,307,531 | 12/1981 | Honse | 43/42.24 |
| 4,411,089 | 10/1983 | Runeric | 43/42.25 |

*Primary Examiner*—Richard K. Seidel
*Assistant Examiner*—Chuck Y. Mah
*Attorney, Agent, or Firm*—Griffin Branigan & Butler

[57] ABSTRACT

Artificial-bait material comprises a light-pervious substrate and fine, water-repellant, featherlike elements bonded to the substrate. The substrate is composed of two light-pervious films and an adhesive containing a coloring material for bonding the two films. An artificial bait assembly comprises a hook and artificial bait. At least a part of the artificial bait comprises a light-pervious, sheet-like substrate and fine featherlike elements having a water repellent applied thereto. The fine feathers are bonded to the sheet-like substrate. The sheet-like substrate has two light-pervious plastic films, and an adhesive for bonding the two plastic films and coloring to form a design pattern.

4 Claims, 1 Drawing Sheet

ARTIFICIAL BAIT AND MATERIAL THEREFOR

FIELD OF THE INVENTION

This invention relates to artificial bait and a material therefor.

BACKGROUND AND PRIOR ART OF THE INVENTION

Flyfishing, i.e. the European and American type of "feather-and-line" fishing, utilizes the habit of fish of the trout genus actively to prey on insects. This type of fishing uses artificial bait having characteristics of insects to be preyed upon by the fish. The artificial bait is cast and caused to be floated or sunk into water near the position of the fish without surprising the fish so that it is within the visual field of the fish and induces misunderstanding on the part of the fish so that the fish will prey on the bait and get caught on an incorporated hook.

The mayfly, for example, passes its larval stage in water, and, on emergence, temporarily comes afloat on the water surface before flying into the air. Trout like to prey upon these mayflies on the water surface.

Accordingly, an artificial mayfly bait is a particularly preferred artificial bait because, when seen from under water, it looks like an emergent mayfly afloat on the water surface.

When on the water surface, the body of the emerged mayfly distorts the water surface in a depressed shape and comes afloat on the water surface by surface tension. When the water surface is distorted into a depressed shape the direction of refraction of light is differentiated from the surrounding water surface. As a result, when one looks up from under-water the depressed part in question is viewed with an outstanding contrast with respect to the surrounding water surface. As will now be explained, this phenomenon has to do with total reflection which is caused by a difference between refractive indices of water and air (atmospheric air).

(1) The critical refraction angle of a water surface is 48.8 degrees. Hence, it is impossible to see an object above the water surface if viewed from below at an angle of greater than 48.8 degrees. When viewed from such an angle all that is seen is a relatively dark undersurface of the object.

(2) If the object is viewed from below at an angle less than the critical angle the object can be seen through the water.

The above phenomenon is known as a "fish window." It is a phenomenon by which, for the above-mentioned optical reasons, the shape of an object above the water surface is seen as though through a skylight through the water. That is, the range of view of visual points on the underwater side of an object is that falling within a vertical inverted cone having a conical angle of 97.6 degrees (twice the critical angle).

When an aforesaid depressed portion is on the water surface and viewed from under water as in (1), the surrounding of the depressed portion cannot be seen. But the part of the object falling within the critical angle or cone is characteristically viewed as being of strongly-shining silver.

When the relationship between the depressed part and the visual angle from under water is as set forth in (2) above, the surrounding of the depressed portion is within the critical angle from the visual point, and therefore objects on or above the water surface, such as the sky, can be seen through the water surface. On the other hand, a macro-portion having a viewing point that is outside the critical angle is viewed as a dark region, contrary to the case of (1).

In any case, the depressed portion looks different from the surrounding normal water surface. This gives rise to a high possibility that a fish will consider this to be an important characteristic symbol when the fish discovers an insect afloat on the water surface and makes it a target. Actually, it is known from experience that it is a desirable effect for an artificial bait to reproduce such a characteristic when viewed from under water.

However, in the case of (2), when an object floating on the water surface is viewed from under water it becomes a silhouette. Thus, in many cases, when the wings of an insect are light pervious, a theoretical corollary is that an artificial bait imitating it should also be light pervious. In this respect, the use of a light-pervious sheet material in accordance with this invention provides a perfect effect.

Sometimes fishermen use living mayflies on a hook that is then cast to the target site. The live bait is liable, however, to be forced to drop from the hook by pneumatic resistance and, even if it does not drop off, it has a very low possibility of naturally floating on the water surface. This way of fishing, however, is fundamentally different from "fly fishing" to which the present invention is directed.

The floating ability of artificial bait can be improved by simply reducing the weight of the artificial bait. It is difficult, however, to make artificial bait that resembles a mayfly afloat on the water surface. If its weight is decreased, the artificial bait floats, owing to its buoyancy, but the bait becomes saturated with water, and it apparently differs in appearance from a mayfly floating on the water surface.

To make the artificial bait resemble the mayfly floating on a water surface, it is conceivable to form the artificial bait in a shape resemblying a mayfly and give repellency to its surface. In this case, too, however, it is difficult to float the artificial bait properly because the artificial bait makes contact with the water surface at a plane, and there is ineffective generation of an upward force by surface tension. Furthermore, the water repellency of the surface of the artificial bait is deteriorated within short periods of time, and the artificial bait becomes saturated.

The mayfly has been described in the above description. The same can be said, however, with respect to other floating insects, such as the caddisfly and the stonefly.

SUMMARY OF THE INVENTION

It is an object of this invention to provide an artificial bait and a material which, when seen from under water, looks very similar to live bait floating on the water surface.

Another object of this invention is to provide artificial bait which is structured so that its speed is moderately decreased as it falls onto the water surface so that the shock of its falling onto the water is reduced.

Another object of the invention is to provide artificial bait which is structured to inhibit the occurrence of a whirl behind the artificial bait at the time of casting so as to prevent the artificial bait from turning.

Still another object of this invention is to provide an artificial bait which can be easily viewed even under backlight.

The foregoing and other objects, features, and advantages are achieved by using for the artificial bait a material comprising a light-pervious substrate and water repellent, fine featherlike elements bonded to the substrate.

An artificial bait assembly also includes a hook and the substrate is sheet-like and comprised of two light-pervious plastic films that are adhesively bonded and colored to form a pattern.

DETAILED DESCRIPTION OF THE PREFERRED EMBODIMENT

Figure 1:
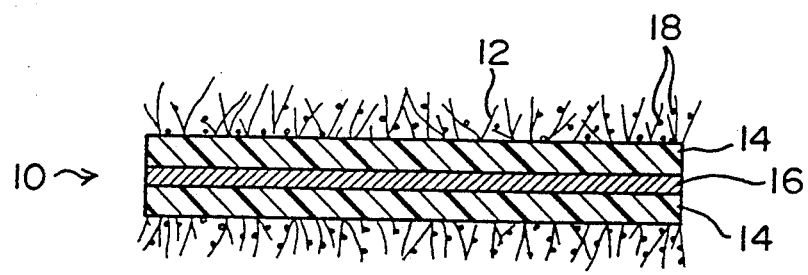
FIG. 1 is a simplified sectional view of the material for the artificial bait in accordance with a preferred embodiment; and, FIG. 2 is a side elevation of the artificial bait in accordance with a preferred embodiment of the invention.

With reference to FIG. 1, an artificial bait is provided with a sheet-like substrate 10 and a number of fine featherlike elements or "feathers" 12 are bonded to the sheet-like substrate by means of an adhesive.

The sheet-like substrate 10 is composed of two light-pervious films 14 and an adhesive 16 bonding them together. The thickness of the sheet-like substrate 10 is, for example, in the range of 0.005 to 0.05 mm.

The light-pervious film 14 may be formed of a plastic material such as polyethylene and/or polyester which is colored during its formation to provide a desired pattern. Alternatively, a desired pattern can be formed by incorporating a coloring material in the adhesive 16, or a desired pattern can be formed by coloring the outside or the inside of the light-pervious film. The most preferred method is to form the desired pattern by incorporating a coloring material into the adhesive agent 16. In this manner the pattern is held together and protected by the two light-pervious plastic films 14. Accordingly, even when the bait gets wet with water, there is little danger of the pattern being lost or damaged.

The sheet-like substrate 10 may include a slit or a pore; and, the fine featherlike elements 12 can be bonded to the sheet-like substrate 10 by any suitable adhesive. Each of the "feathers" 12 is bonded partly to the sheet-like substrate 10, but a principal part is preferably separated from the sheet-like substrate 10 as shown in FIG. 1.

The fine featherlike elements 12 have a thickness range between about 0.001 mm to about 0.5 mm, and a length between about 0.5 mm and 20 mm. Preferably, however, the thicknesses are generally not more than 0.05 mm. As the feathers become finer their surface area increases and they tend more easily to float on water. The length of the feathers need not be uniform, and feathers of various lengths may be present in a mixture.

Examples of the fine featherlike elements 12 that can be used include, for example, plant fibers such as cotton and kapok, animal hair such as rabbit and squirrel, and synthetic fibers such as polypropylene and nylon, and even true feathers or portions thereof.

Preferably, a granular or powdery water repellent 18 is adhered to the featherlike elements 12.

Paraffins, waxes, metal salts and metal soaps may be used as temporary water repellents. Zirconium salts of fatty acids and silicone resins may be used as semipermanent water repellents. When the fine featherlike elements 12 are fibers of cellulose resins, octadecyloxy methypyridiinium chloride (Velan KTP) or stearamidemethylpyridinium chloride (Felan AP, Felan RFSD) may preferably be used.

If the fine featherlike elements 12 have sufficient natural water repellency, the use of additional water repellent may be omitted.

When the fine featherlike elements 12 are to be bonded to the film-like substrate 10 by a tacky material, the use of a granular or a powdery water repellent 14 is especially preferred. Specifically, a tacky material is coated onto the film-like substrate 10 and fine featherlike elements are sprinkled on it. Only a part of the fine featherlike elements 12 is adhered to the film-like substrate 10, however, and a greater portion of the fine feathers are maintained separated from the adhesive. When the water repellent 18 is applied it adheres only to the tacky material and the fine feathers 12. In this manner, that part of the fine feathers 12 which does not adhere to the tacky material is prevented from adhering to the fine feathers 12.

As stated above, by using the water repellent 18, the water repellency of the fine feathers 12 may be increased. By coating the water repellency 18 to the flat surface rather than to the fine feathers a larger amount of the water repellency can be adhered, and from this point, too, the fine feathers can be maintained well afloat on the water surface. The form of the substrate 10 is not limited to a true sheet-like form. As noted below, various three-dimensional solid substrates, such as a band-like substrate or a filament-like substrate may also be used. However, the film-like or true sheet-like substrate is most preferred because it is light and can be easily fabricated into a shape resembling an insect.

In the above regard three types of featherlike elements are contemplated.

The first type of featherlike element is one which is water-repellent per se.

The second type of featherlike element is one which is not water-repellent per se but which has a water-repellent property because of a water repelling agent applied thereto.

The third type of featherlike element is one which is water-repellent per se and to which a water repelling agent is applied so as to reinforce its water-repellent property.

When one floats an artificial bait formed out of the above-described material on water, the featherlike elements come into contact with water. The artificial bait then floats on water by virtue of water-repellence of the featherlike elements; and, at least in principle, the substrate can be out of contact with the water.

Figure 2:
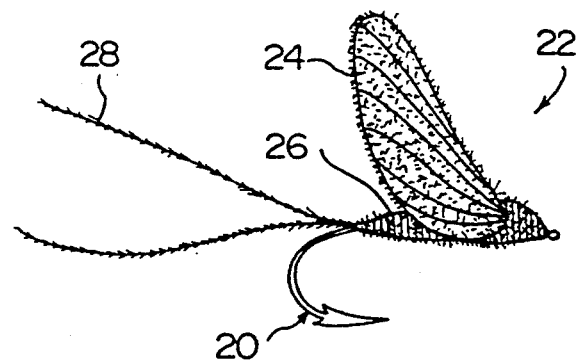

With reference to FIG. 2, an artificial bait assembly comprises a hook 20 and an artificial bait 22.

The artificial bait 22 is of a shape resembling a mayfly having a wing portion 24, a body portion 26 and a tail portion 28.

The wing portion is constructed, for example, by the film-like substrate illustrated with reference to FIG. 1 by shaping the material for the artificial bait in the form of a wing.

The body portion 26 is formed of a band-like substrate which may have a water repellent applied thereto. Fine feathers are bonded to the band-like substrate and may also have a water repellent applied thereto. Specifically, the band-like substrate having fine feathers adhering thereto is rounded around the hook to form a body resembling a mayfly.

The tail portion 20 is composed, for example, of a substrate of nylon monofilaments, and fine feathers having a water repellent added thereto are adhered to that substrate.

The artificial bait formed in this way floats on the water surface by means of the fine feathers and the applied water repellent on the wing portions 24. Water repellent can also be applied to the body portion 20 and the tail portion 28. When it is seen from under water, the thusly floating artificial bait appears very much like a mayfly floating on the water surface.

The artificial bait of the above example is formed in a shape resembling a mayfly, but it may also be formed in a shape resembling another insect.

In the above example, all parts of the artificial bait—that is, its wing portion 24, its body portion 26 and its tail portion 28—are composed of a light-pervious substrate and the fine feathers have a water repellent adhering thereto.

Alternatively, only a part of the wing portion alone may be composed of a light-pervious substrate and the fine feather portions adhering thereto may be coated with a water repellent.

In an ordinary use, the water repellency of the body portion is degraded as a result of repeated casting. This degradation of the water repellency of the body portion can be a problem, but the water repellent can be renewed. By composing the wing portion 24 from a light-pervious substrate and fine feathers having a water repellent adhered thereto, however, the water repellency of the wing portion can be maintained for a long period of time.

The water repellency of the wing portion is especially important in the type of the artificial bait, wherein the wing is open to the point of being horizontal so that one wing surface and its feathers are brought into contact intimately with the water surface. This is called a spent fry, and imitates a mayfly on the verge of death after copulation and egg laying.

If desired, only a part of the body portion 26 may be composed of a light-pervious substrate having fine feathers and a water repelling agent can be adhered to the substrate.

In a preferred embodiment of this invention, however, at least the fine feathers 12 have a water repelling agent applied thereto.

For example, in the artificial bait shown in FIG. 2, the body portion 26 usually makes contact with the water surface. Hence, it may be desirable to increase the water repellency of the body portion 26.

It may also be significant to constitute only a part of the tail portion 28 from a light-pervious substrate and fine feathers having a water repelling agent adhering thereto.

In the artificial bait shown in FIG. 2, the body portion 26, as noted, usually makes contact with the water surface. The wing portion 24 extends upwardly. In this type of artificial bait, it is not preferable for the wing portion 24 to contact the water surface. If the artificial tail portions 28 are set in a sufficiently laterally-opened state as shown in FIG. 2, and if the artificial bait falls sideways, the outermost end of the tail portion 28 touches water first; and, the outermost end of the tail portion 28 is supported by the surface tension of the water to prevent the artificial bait from falling down sideways.

When the fish is caught by the artificial bait of this invention, the artificial bait is violently drawn into the water and the water repellency of the artificial bait is reduced. In this case, the water can be removed and the water-repelling agent can again be applied to completely restore the bait's water repellency.

The embodiments of the invention in which an exclusive property or privilege is claimed are defined as follows:

1. An artificial bait assembly comprising a hook and an artificial bait,
   at least apart of the artificial bait comprising a light-pervious sheet-like substrate and fine, water-repellent, featherlike elements;
   said fine featherlike elements being bonded to the sheet-like substrate;
   the sheet-like substrate having two light-pervious plastic films, and an adhesive for bonding the two plastic films together; and,
   means for coloring said substrate;
   said bait including a body portion, a wing portion, and a tail portion,
   said wing portion being formed of said light-pervious sheet-like substrate;
   said body portion being formed of a band-like substrate; and,
   said tail portion being formed of a filament material;
   said fine featherlike elements being applied to said wing, body, and tail portions; and, said water repellent being applied to at least a portion of said featherlike elements.

2. The assembly of claim 1 wherein said tail portion includes at least two tail elements and wherein said at least two tail elements have first ends thereof attached to said body portion and the other ends thereof spread apart for preventing said artificial bait from falling down sideways into the water.

3. The assembly of claim 1 wherein said sheetlike substrate is between about 0.005 mm and 0.05 mm in thickness; and,
   said fine featherlike elements are between about 0.001 mm and 0.5 mm thick and between about 0.5 mm to 20 mm long.

4. The assembly of claim 3 wherein said featherlike elements are about 0.05 mm thick.

* * * * *